Figure 1:
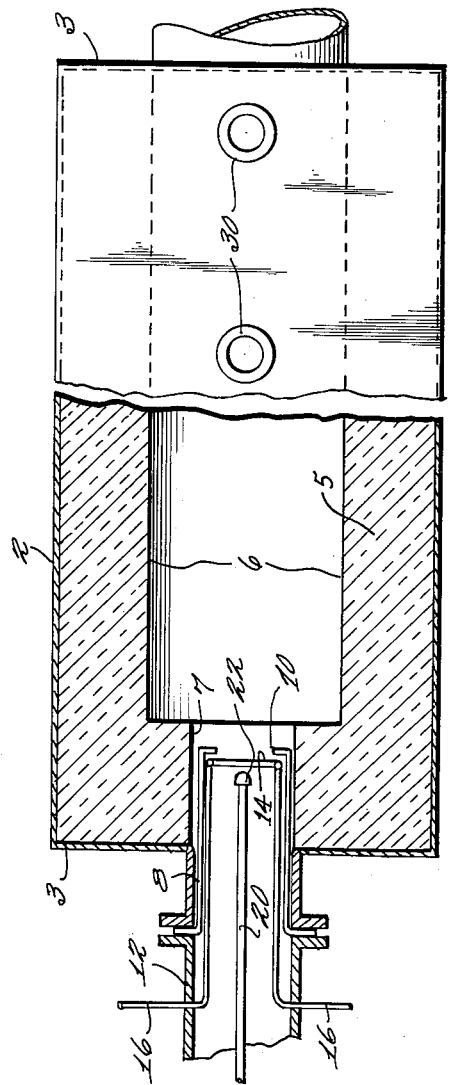

Oct. 24, 1961     T. A. RUBLE     3,005,689
APPARATUS FOR MAKING CARBON BLACK
Filed Dec. 1, 1958     2 Sheets-Sheet 1

INVENTOR
THEODORE A. RUBLE
BY Floyd Trimble
ATTORNEY

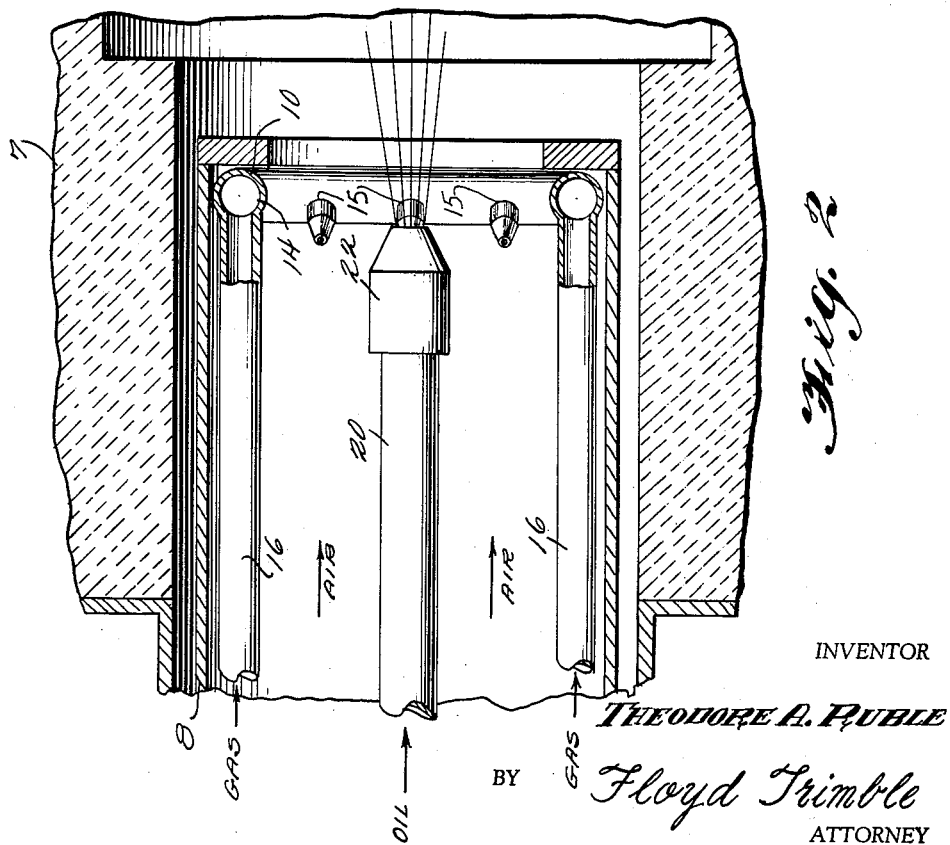

United States Patent Office 3,005,689
Patented Oct. 24, 1961

3,005,689
APPARATUS FOR MAKING CARBON BLACK
Theodore A. Ruble, Amarillo, Tex., assignor to Continental Carbon Company, Houston, Tex., a corporation of Delaware
Filed Dec. 1, 1958, Ser. No. 777,390
2 Claims. (Cl. 23—259.5)

The present invention relates to the manufacture of carbon black from any type of hydrocarbons, including petroleum oils.

It is generally known in the art that the superior grades of carbon blacks characterized by smaller particle size are obtained by high temperature cracking reaction which proceeds to its conclusion in the shortest possible time; and that the high temperature is attained by complete combustion of a fuel gas and the injection of hydrocarbon mist or vapor directly into the hot products of combustion. Usually, excess air is admitted into the combustion process in order to obtain additional heat from the partial combustion of the oil. It is also well known in the art that rapid mixing of the hydrocarbon mist or vapor with the hot products of combustion is essential for carbon black possessing the desired particles of small size.

I am aware of numerous patents which disclose the obtaining of oil mists or vapors either by heat vaporization or mechanical spray nozzles, as well as other patents which disclose refractory lined furnaces which are so constructed and arranged as to obtain turbulent flow and thorough mixing of the hydrocarbon mist or vapors with the hot products of combustion of either fuel gas or oil. Also the patent, and other, literature contains disclosures of a combination of mist injection and refractory lined furnaces for producing carbon black that depend upon rotational flow or refractory obstructions or similar devices to obtain turbulence and mixing of the hot products of combustion and the carbon containing feedstock.

It is among the objects of the present invention to provide an improved apparatus for making carbon black from hydrocarbon, such as petroleum oils, and particularly one wherein the combustion air and fuel gas are mixed by a high degree of turbulence, the air-gas mixture ignited, and the hydrocarbon (in mist or vapor form) introduced into the flame base at the point where combustion starts; and does not depend on prior complete combustion of gaseous fuel. Extreme turbulence is obtained by passing a mixture of gas and air at high velocity through a metallic orifice or restriction, and the further expansion of the gas by rapid combustion. By injecting the oil mist or vapor directly into this extremely turbulent and burning zone prior to complete combustion, the cracking reaction obtains its heat instantaneously as the heat is released from the combustion. The extreme turbulence, heat, and mixing is almost entirely obtained by the arrangement of the injection device and is not dependent upon a refractory furnace lining of intricate design. In this connection, excellent results have been obtained by using a simple refractory tube which is cylindrical in shape and which contains no obstructions, refractory orifices, or other devices calculated to promote turbulence.

According to the apparatus of the present invention, it is not necessary to protect the refractory walls of the furnace from carbon deposits by utilizing an envelope of combustion gases which surround the injected oil mist or vapor, since the reaction is virtually complete before the hydrocarbon mist or vapor can reach the refractory walls.

Another object is the provision of a novel apparatus wherein the quality of the end product may be varied over a rather wide range by regulating the velocity of the hydrocarbon through the injector, recognizing that the higher the velocity, the greater the turbulence which results in carbon black of smaller particle size.

Still another object is to provide an apparatus capable of obtaining the foregoing objectives which is comparatively simple and inexpensive to manufacture, install and maintain.

Generally stated, the apparatus of the present invention is constructed and arranged to effect:

(1) Co-mingling of the fuel gas and air in the inlet port (or ports) of a combustion chamber.

(2) Thorough mixing of the fuel gas and air by passing the mixture through an orifice or restriction at high velocity.

(3) Passage of the mixture of fuel gas and air immediately into a combustion chamber wherein the gas burns in a turbulent flame at a high temperature.

(4) Introduction of the oil (hydrocarbon) in an atomized or vaporized state into the turbulent flame base where the combustion starts, whereby the finely subdivided hydrocarbon comes in violent contact with the turbulent hot gases, resulting in a rapid rate of heat transfer to the hydrocarbon and rapid cracking to carbon black.

(5) Cooling of the hot gases and suspended carbon black by means of quench sprays or heat exchanges, or both, to a point where the reaction stops and the gas is cool enough to handle in a carbon black collecting device.

The invention, then, comprises the features hereinafter fully described and as particularly pointed out in the claims, the following description and the annexed drawings setting forth in detail certain illustrative embodiments of the invention, these being indicative of some of several ways in which the principles of the invention may be employed.

In said drawings:

FIGURE 1 is a longitudinal elevation, partly in section, of a form of apparatus which embodies the teachings of the present invention; and FIGURE 2 is an enlarged longitudinal view, partly in section, which illustrates in detail the orifice type burner of the apparatus.

Referring more particularly to the drawings, the numeral 2 designates an elongate metallic housing or shell which is provided at each end with an inwardly directed annular flange 3.

Disposed within the metallic housing or shell 2 and its annular end flanges 3 is a refractory furnace lining 5 which defines a cylindrical chamber 6 within which the combustion and cracking operations take place.

That portion of the refractory lining which defines the inlet end of the furnace or reactor is shaped to provide an axially disposed cylindrical inlet port 7 of reduced diameter.

Disposed to extend partially into the cylindrical inlet port 7 is a cylindrical sleeve 8, the inner end of which carries an annular flange 10, which extends inwardly at approximately 90°, the latter forming a flame orifice ring, as will be later described.

To the rearward or upstream end of the cylindrical shell 8 there is connected an air supply conduit 12 of similar diameter.

Within the cylindrical sleeve 8, and closely adjacent its inwardly directed annular flange 10, is a fuel gas discharge ring 14 which is supported by and communicates with, a series of fuel gas supply pipes 16. The function of the fuel gas discharge ring 14 is to distribute the fuel gas around the annular flange 10 (which forms the flame holder ring) on the upstream side of the cylindrical sleeve 8. In order that this may be effectively done, the fuel gas discharge ring, or manifold, 14 is provided with a series of jets 15 which are equi-distantly spaced and directed upstream, or toward the rear of the cylindrical sleeve or flame holder 8. The air and fuel gas are further mixed by the turbulent flow through the flame holder ring (i.e., annular flange 10) and burn immediately after being discharged into the combustion chamber 6. The air velocity through the flame holder orifice is always kept higher than the flame progression rate so that the flame will not flash back into the flame holder.

The oil supply pipe is shown at 20 as extending axially within the cylindrical (flame holder) sleeve 8; and it is provided with a spray head 22 which is disposed slightly rearwardly of the fuel gas discharge ring 14. Thus, the oil is supplied through oil pipe 20 and spray head 22 to the combustion chamber 6 at the point where combustion starts. The spray head 22 atomizes the oil into fine droplets which are suspended in the highly turbulent flame.

In the event vaporized hydrocarbon is used, the spray head or nozzle 22 may be removed and an open-end oil pipe substituted therefor.

As the gas and suspended carbon black leave the combustion zone, the hydrocarbon cracking reaction is brought to completion by introducing atomized water through spray ports 30. These spray ports 30 accommodate water pipes and spray heads or nozzles which, being well known in the art, are neither shown in the drawings nor specifically referred to hereinafter.

The reaction time is regulated by the distance between the flame holder (i.e., annular inwardly extending flange 10 on the inner end of the cylindrical sleeve 8) and the quench spray, and as many spray ports 30 as necessary may be used.

As before stated, the quality of the carbon black is controlled primarily by the velocity through the flame holder orifice, this velocity being regulated by the flow of air and fuel gas passing through the orifice, and the diameter of the orifice. Higher velocities through the orifice provide more turbulence, resulting in a finer particle size carbon black that has a higher abrasion resistance in rubber tires, etc.

Secondary controls of the carbon black quality are the reaction time and the oil rate.

From the foregoing, it will be seen that the flame holder disclosed herein will produce a uniform mixture of fuel gas and air by passing this mixture through a restriction which, in turn, produces a high degree of turbulence and also results in a higher turbulent flame upon ignition. The hydrocarbon is introduced into the turbulent flame at the point where combustion starts; and the fuel gas, air, and hydrocarbon are all introduced perpendicularly to the inlet wall of the furnace so that no rotation motion of the main mass of burning gas results. The mixing fuel gas, air, and hydrocarbon may, of course, be introduced into the combustion chamber through one or more inlet ports containing flame holders, etc.

The products consisting of gases and suspended carbon black are cooled by means of the aforementioned quench sprays and/or a heat exchange (following the combustion zone) to a temperature low enough to handle in one of the standard collecting devices common to the carbon black industry. Most of the suspended carbon black is removed in the carbon black collector; and the effluent gases are discharged to the atmosphere.

While I have shown and described certain specific embodiments of the present invention, it will be readily understood that I do not wish to be limited exactly thereto, since various modifications may be made without departing from the scope of the invention as defined in the appended claims.

I claim:
1. In an apparatus for making carbon black comprising a primary cylindrical heat insulated reaction chamber having a cylindrical heat insulated inlet port; a circular sleeve disposed in and removable from said inlet port; the inner end of said circular sleeve terminating in an inwardly extending annular flange; said circular sleeve including its annular flange being substantially imperforate; a circular manifold disposed in said circular sleeve immediately adjacent the rearward side of said annular flange; a series of jets communicating with said circular manifold and directed rearwardly with respect thereto; at least one conduit for supplying fuel gas to said circular manifold; an oil supply pipe disposed axially of said cylindrical inlet port; the inner end of said oil supply pipe terminating adjacent to and spaced upstream of the rearward side of said circular manifold; and means for supplying combustion air to the interior of said circular sleeve.

2. In an apparatus for making carbon black comprising a primary cylindrical heat insulated reaction chamber having a cylindrical heat insulated inlet port; a circular sleeve disposed in and removable from said inlet port; the inner end of said circular sleeve terminating in an inwardly extending annular flange; said circular sleeve including its annular flange being substantially imperforate; a circular manifold disposed in said circular sleeve immediately adjacent the rearward side of said annular flange; a series of jets communicating with said circular manifold and directed rearwardly with respect thereto; at least one conduit for supplying fuel gas to said circular manifold; an oil supply pipe disposed axially of said cylindrical inlet port; the inner end of said oil supply pipe terminating adjacent to and spaced upstream of the rearward side of said circular manifold; a spray nozzle on the inner end of said oil supply pipe; and means for supplying combustion air to the interior of said circular sleeve.

References Cited in the file of this patent

UNITED STATES PATENTS

| | | |
|---|---|---|
| 1,951,379 | Voorheis | Mar. 20, 1934 |
| 2,117,968 | Lutherer | May 17, 1938 |
| 2,572,338 | Hartwig et al. | Oct. 23, 1951 |
| 2,625,466 | Williams | Jan. 13, 1953 |
| 2,682,450 | Sweigart et al. | June 29, 1954 |
| 2,709,838 | Schrader | Apr. 30, 1957 |
| 2,801,157 | Campbell et al. | July 30, 1957 |

FOREIGN PATENTS

| | | |
|---|---|---|
| 743,879 | Great Britain | Jan. 25, 1956 |
| 786,730 | Great Britain | Nov. 27, 1957 |